US006471628B1

(12) United States Patent
Hirayama

(10) Patent No.: US 6,471,628 B1
(45) Date of Patent: Oct. 29, 2002

(54) DEVELOPING ROLLER WITH POROUS SURFACE

(75) Inventor: Naka Hirayama, Tokyo (JP)

(73) Assignee: Nitto Kogyo Co. Ltd., Tokyo (JP)

( * ) Notice: Subject to any disclaimer, the term of this patent is extended or adjusted under 35 U.S.C. 154(b) by 0 days.

(21) Appl. No.: 09/213,863

(22) Filed: Dec. 17, 1998

(30) Foreign Application Priority Data

| | | |
|---|---|---|
| Dec. 26, 1997 | (JP) | 9-366914 |
| Dec. 26, 1997 | (JP) | 9-366915 |
| Oct. 27, 1998 | (JP) | 10-305637 |
| Oct. 27, 1998 | (JP) | 10-305638 |

(51) Int. Cl.[7] .......... B23P 15/00

(52) U.S. Cl. .......... 492/56; 492/54; 492/58

(58) Field of Search .......... 492/56, 58, 18, 492/54; 399/281, 333; 428/35.8, 450, 36.91, 36.5, 213, 215, 216, 423.1; 430/124, 99, 102

(56) References Cited

U.S. PATENT DOCUMENTS

| | | | | | |
|---|---|---|---|---|---|
| 5,095,339 | A | * | 3/1992 | Terashima | 355/251 |
| 5,468,531 | A | * | 11/1995 | Kikukawa et al. | 428/36.5 |
| 5,471,285 | A | * | 11/1995 | Nagase et al. | 355/219 |
| 5,482,552 | A | * | 1/1996 | Kikukawa et al. | 492/56 |
| 5,520,600 | A | * | 5/1996 | Fukumoto | 492/56 |
| 5,567,494 | A | * | 10/1996 | Ageishi et al. | 428/36.9 |
| 5,609,554 | A | * | 3/1997 | Mayashi et al. | 492/56 |
| 5,761,581 | A | * | 6/1998 | Nojima | 399/174 |
| 5,779,795 | A | * | 7/1998 | Bucher et al. | 118/264 |
| 5,782,730 | A | * | 7/1998 | Kawasaki et al. | 492/56 |
| 5,786,091 | A | * | 7/1998 | Kurokawa et al. | 428/421 |
| 5,804,309 | A | * | 9/1998 | Itoh et al. | 492/56 |
| 5,819,646 | A | * | 10/1998 | Fukunaga | 100/176 |
| 5,827,160 | A | * | 10/1998 | Ohki et al. | 492/56 |
| 5,851,657 | A | * | 12/1998 | Yasuno et al. | 428/332 |
| 6,148,170 | A | * | 11/2000 | McMindes et al. | 492/56 |
| 6,167,225 | A | * | 12/2000 | Sasaki et al. | |

FOREIGN PATENT DOCUMENTS

| | | |
|---|---|---|
| JP | 2504978 | 4/1996 |

* cited by examiner

*Primary Examiner*—I Cuda-Rosenbaum
(74) *Attorney, Agent, or Firm*—Armstrong, Westerman & Hattori, LLP

(57) ABSTRACT

A developing roller is provided with a roller core, an electrically conductive layer provided on a circumferential surface of the roller core, and a covering layer provided on the outer circumferential surface of the conductive layer. The covering layer has a thickness of 30 μm or less, but 0.1 μm or more, and has at least its surface region formed of a porous body.

20 Claims, 2 Drawing Sheets

DEVELOPING ROLLER WITH POROUS SURFACE

BACKGROUND OF THE INVENTION

The present invention relates to a developing roller for use in a developing apparatus such as a copying machine, a facsimile machine or a laser beam printer, and a method of producing the same. More particularly, the present invention relates to a developing roller for use in a non-magnetic one-component toner developing apparatus, and a method of producing the same.

Conventionally, a developing system which uses a magnetic two-component toner has prevailed in a developing apparatus such as a laser beam printer. However, in view of recently increasing concern about the global environmental preservation and the material saving, attention are being paid on a developing system using a non-magnetic one-component toner, which does not require recovery of the toner, generating no waste toner, and which uses out all the toner in the toner cartridge. Thus, efforts have been made to put this system into practical use.

The developing apparatus based on the non-magnetic one-component toner developing system basically has a photosensitive drum, electrostatic image-forming means for forming an electrostatic image on the photosensitive drum, a developing roller rotating in contact with the photosensitive drum, a toner-supplying member consisting of, for example, a urethane sponge supply roller, for supplying a non-magnetic one-component toner onto the developing roller, and a toner-regulating member consisting of, for example, a blade made of a urethane rubber or a urethane resin, for uniformly regulating the thickness of the toner supplied onto the developing roller. In general, while the electrostatic image-forming means forms an electrostatic image on the surface of the photosensitive drum based on the predetermined image information, the toner-supplying member supplies the toner onto the surface of the developing roller, and the toner-regulating member regulates the thickness of the toner supplied on the developing roller to form a uniform thin layer of the toner on the developing roller. The developing roller, on which the thin toner layer of a uniform thickness is formed, sequentially allows the toner to adhere to the electrostatic image formed on the photosensitive drum at the nip between it and the drum. In this way, the toner development is effected.

The developing roller, used in a developing apparatus of such a non-magnetic one-component toner developing system, allows the toner, which is positively or negatively charged by the frictional contact, to electrostatically adhere to its surface. The roller is constituted by an electrically conductive roller. Such an electrically conductive roller usually has a construction wherein an electrically conductive core (roller core) constituting the roller body has, on its cylindrical surface, an electrically conductive layer made of an electrically conductive material. Conventionally, as the electrically conductive material forming the electrically conductive layer, use is made of an electrically conductive rubber material containing a rubber material such as a silicone rubber, an acrylonitrile-butadiene rubber, a urethane rubber or a silicone-modified ethylene-propylene rubber, as a base, added to which is an electrically conductive material, such as carbon black or metallic powder, for imparting electrical conductivity thereto.

However, the silicone rubber and the silicone-modified ethylene-propylene rubber contains a low molecular weight siloxane therein, which migrates onto the surface, contaminating the surface of the photosensitive drum which contacts the developing roller. The acrylonitrile-butadiene rubber uses sulfur or a sulfur derivative as a vulcanizing agent, which contaminates the photosensitive drum surface. On the other hand, while the urethane rubber hardly contaminates the photosensitive drum, its volume resistivity value largely changes in accordance with the change of its environment (i.e., large in environmental dependency), lacking in practical utility.

In order to overcome the problems of the prior art rubber-based conductive layers, in particular, the contamination problem of the photosensitive drum surface, Japanese Patent No. 2504978 discloses a technique of applying a covering layer to a rubber-based conductive layer. The disclosed covering layer is made of a reaction product of a urethane resin with a fluorine-containing compound having a functional group, i.e., a fluorine-containing urethane resin. The covering layer can stop the migrating contaminants contained in the base rubber thereat, making it possible to prevent the contamination of the photosensitive drum surface by the migrating contaminants.

However, the developing roller provided with the fluorine-containing conductive layer gives rise to generation of so-called negative ghosts. For example, there occurs a problem that when an original having black regions in the background of characters is printed, the characters are slightly copied in the black regions in the printed sheet.

BRIEF SUMMARY OF THE INVENTION

It is therefore a main object of the present invention to provide a developing roller which does not bring about the generation of negative ghosts, or which can suppress the generation of negative ghosts to a large extent.

A further object of the present invention is to provide a developing roller which does not contaminate the surface of the photosensitive drum, and yet does not bring about the generation of negative ghosts, and method of producing the same.

A still further object of the present invention is to provide a developing roller whose triboeletric series or electrostatic chargeability can be controlled to be suitable for either a positively charged toner or a negatively charged toner, and a method of producing the same.

According to a first aspect of the present invention, there is provided a developing roller comprising a roller core, an electrically conductive layer provided on a circumferential surface of the roller core, and a covering layer provided on a circumferential surface of the conductive layer, wherein the covering layer has a thickness of 30 $\mu$m or less, but 4 $\mu$m or more, and has at least its surface region formed of a porous body.

In the first aspect of the present invention, the pores in at least the surface region of the covering layer preferably have a size of 3 $\mu$m or less, but 0.1 $\mu$m or more, and the covering layer is preferably entirely formed of such a porous body.

In the first aspect of the present invention, the conductive layer is preferably formed of an electrically conductive rubber material.

In the first aspect of the present invention, the covering layer usually comprises a reaction product of a polyol with an isocyanate compound. Alternatively, the covering layer may comprise a reaction product of a polyol, an isocyanate compound, and a reactive silicone oil having active hydrogen. In these cases, the polyol is particularly preferably a fluorine-containing polyol.

According to a second aspect of the invention, there is provided a developing roller comprising a roller core, an electrically conductive layer provided on a circumferential surface of the roller core, and a covering layer provided on a circumferential surface of the conductive layer, wherein the covering layer is formed by subjecting a reaction mixture containing a polyol, an isocyanate compound, and a pore-forming agent comprising a volatile silicone oil to a reaction condition for reacting the polyol and the isocyanate compound.

To produce this developing roller, the present invention provides a method of producing a developing roller comprising the steps of providing a roller core having an electrically conductive layer provided on a circumferential surface thereof, applying a reaction mixture containing a polyol, an isocyanate compound, and a pore-forming agent comprising a volatile silicone oil to a surface of the conductive layer, and subjecting the reaction mixture to a reaction condition for reacting the polyol and the isocyanate compound.

Further, according to the present invention, there is provided a developing roller comprising a roller core, an electrically conductive layer provided on a circumferential surface of the roller core, and a covering layer provided on a circumferential surface of the conductive layer, wherein the covering layer is formed by subjecting a reaction mixture containing a polyol, a reactive silicone oil having active hydrogen, an isocyanate compound, and a pore-forming agent comprising a volatile silicone oil to a reaction condition for reacting the polyol and the reactive silicon oil with the isocyanate compound.

To produce this developing roller, the present invention provides a method of producing a developing roller comprising the steps of providing a roller core having an electrically conductive layer provided on a circumferential surface thereof, applying a reaction mixture containing a polyol, a reactive silicone oil having active hydrogen, an isocyanate compound, and a pore-forming agent comprising a volatile silicone oil to a surface of the conductive layer, and subjecting the reaction mixture to a reaction condition for reacting the polyol and the reactive silicone oil with the isocyanate compound.

In the present invention, the polyol is preferably a fluorine-containing polyol, and is particularly preferably a copolymeric polyol containing ethylene tetrafluoride monomer units as the main component.

In the present invention, the reactive silicone oil is preferably represented by the following formula (1) or (2):

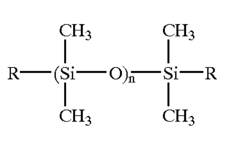

(1)

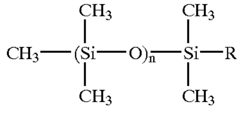

(2)

In the formulas (1) and (2), each R represents $—C_3H_6OC_2H_4OH$ or $—C_3H_6OCH_2—C(CH_2OH)_2C_2H_5$, and n is an integer of about 20 or less.

In the present invention, the triboeletric series or electrostatic chargeability of the covering layer can be controlled by changing the mixing ratio between the fluorine-containing polyol and the reactive silicone oil.

Further, in the present invention, the conductive layer is preferably formed of at least one rubber selected from silicone rubber, an acrylonitrile-butadiene rubber, a silicone-modified ethylene-propylene rubber, and a urethane rubber, each imparted with electrical conductivity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE INVENTION

The present invention will now be described with reference to the drawings.

Figure 1:
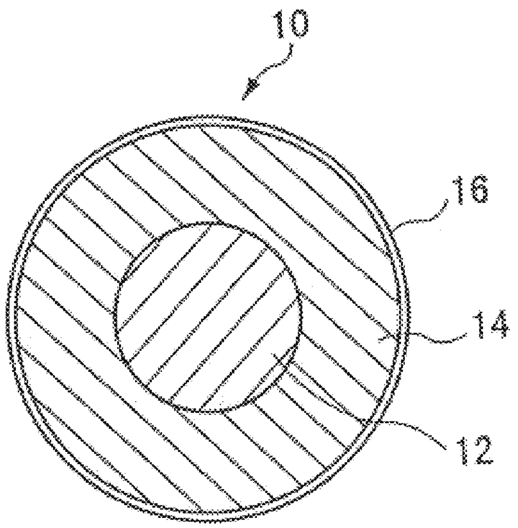
FIG. 1 is a schematic cross-sectional view illustrating a developing roller according to the present invention.

FIG. 1 is a cross-sectional view illustrating a developing roller according to one embodiment of the present invention.

As shown in FIG. 1, a developing roller 10 according to the present invention is basically comprised of an electrically conductive cylindrical roller body (roller core) 12, an electrically conductive layer 14 provided to substantially entirely cover the cylindrical surface of the roller core 14, and a covering layer provided to substantially entirely cover the outer cylindrical surface of the conductive layer 14.

In the present invention, the roller core 12 is not particularly different from a conventional roller core, and can be formed of a metallic material such as iron.

In the present invention, the conductive layer 14 is preferably formed of an electrically conductive elastic polymer material comprised of an elastic polymer material, as a base, added with an electrical conductivity-imparting material such as, for example, carbon black or metal powder. As the elastic base polymer, use may be made of a synthetic rubber material such as a silicone rubber, an acrylonitrile-butadiene rubber, a silicone-modified ethylene-propylene rubber or a urethane rubber, or a thermoplastic elastomer such as a thermoplastic urethane rubber. A base polymer material preferably used in the invention is the synthetic rubber material. The conductivity-imparting material is preferably added to the base polymer in an amount such that the conductive layer 14 may exhibit a volume resistivity of $10^2$–$10^{10}$ Ω·cm. Further, the conductive layer 14 preferably has a JIS A hardness of 20° to 60°.

Furthermore, the developing roller 10 contacts a photosensitive drum or a toner-regulating member with a nip formed therebetween. Thus, if the compression set of the underlying conductive layer is too large, the nip track remains on the developing roller, deteriorating the developed image quality. Therefore, the material forming the conductive layer 14 should most preferably exhibit a compression set of 5% or less after placed under a load of 25% compression at 70° C. for 22 hours, though practically those exhibiting such a compression set of 10% or less may be used without problem.

The covering layer 16 of the present invention differs from the conventional covering layer in the surface and inner structures. The covering layer 16 of the invention has at least its surface region formed of a porous body, in particular, a microporous body, and is preferably entirely formed of such a porous body. It is preferable that the pores present at least in the surface region have a size of 3 μm or less, but 0.1 μm or more, and more preferably 0.1 to 1 μm. Most preferably, the covering layer 16 is entirely formed of a porous body having pores of such a size.

Further, the covering layer 16 of the invention preferably has a thickness of 30 μm or less, but 4 μm or more. If the thickness exceeds 30 μm, the surface roughness of the resultant covering layer tends to be coarsened. On the other hand, if the thickness is less than 40 μm, there is a tendency that the resultant covering layer may not act as a barrier layer which prevents contaminants in the underlying conductive layer 14 from migrating onto the surface of the covering layer, and its wear resistance may be decreased. Most preferably, the thickness of the covering layer 16 is about 10 μm to about 20 μm.

The covering layer of the invention can be formed, for example, by subjecting a reaction mixture containing a polyol, an isocyanate compound, and a pore-forming agent comprising a volatile silicone oil to a reaction condition of the polyol with the isocyanate compound. More specifically, the reaction mixture noted above is placed under a temperature condition sufficient to react the polyol with the isocyanate to produce a polyurethane or to cure the polyol with the isocyanate compound, during which reaction, the volatile silicone oil is volatilized. The volatile silicone oil is volatilized during the reaction to render the reaction product (polyurethane) microporous. In this case, the covering layer 16 naturally comprises the reaction product of the polyol and the isocyanate compound, i.e., polyurethane.

The polyol noted above is preferably liquid at ambient temperature (20–30° C.), and a variety of polyols may be used. Since the covering layer 16 should have an electrostatic chargeability, the polyol is preferably a polyol which can produce, by its reaction with the isocyanate compound, a covering layer (polyurethane) having a large electrostatic chargeability. Preferable examples of such a polyol include polyether polyols such as polyethylene glycol, polypropylene glycol, tetramethylene glycol, and a copolymer thereof.

However, a fluorine-containing polyol is particularly preferably used as the polyol in the present invention. The fluorine-containing polyol not only produces a covering layer having a larger frictional electrostatic chargeability by the reaction with the isocyanate compound, but also reduces environmental dependency of the resistivity of the formed covering layer. The higher the fluorine content of the fluorine-containing polyol, the larger the triboeletric series in the negative side. Preferable examples of such a fluorine-containing polyol include a copolymer made using ethylene trifluoride monomer as a main raw material (copolymer polyol containing ethylene trifluoride monomer units as the main or major component), and a copolymer made using ethylene tetrafluoride monomer as a main component (copolymer polyol containing ethylene tetrafluoride monomer units as the main or major component). These fluorine-containing polyols are commercially available, e.g., under the tradename ZEFFLE from Daikin, Inc., Japan (copolymer polyol containing ethylene tetrafluoride monomer units as the main or major component), and under the tradename LUMIFLON from Asahi Glass Industries, Japan (copolymer polyol containing trifluoromonohaloethylene monomer units as the main or major component). A fluorine-containing polyol commercially available from Dainippon Ink & Chemicals, Inc., Japan, under the tradename DEFENSA may also be used. Such fluorine-containing polyols are, for example, made with ethylene tetrafluoride monomer used as a main raw material, and contain, at least 2 moles of hydroxy monocarboxylic acid ester of acrylic acid and/or glycol monoester of acrylic acid, copolymerized thereto. These fluorine-containing copolymeric polyol are provided with OH components by the acrylic ester monomer noted above (i.e., OH of the carboxyl group for the hydroxy monocarboxylic acid ester of acrylic acid, and the unesterified glycolic OH for the glycol monoester of acrylic acid). In the present invention, the copolymeric polyol containing ethylene tetrafluoride monomer as the major component is particularly preferred.

As the isocyanate compound, use may be preferably made of a diisocyanate such as diphenylmethane diisocyanate (MDI), tolylene diisocyanate (TDI), or hexamethylene diisocyanate (HDI), or a biuret-modified form, isocyanurate-modified form, or urethane-modified form thereof. A particularly preferable isocyanate compound includes HDI, or a biuret modified form, isocyanurate modified form, or urethane modified form thereof. The isocyanate compound can produce a polyurethane covering layer 16 having a higher flexibility as its molecule length is longer.

The volatile silicone oil used in the present invention is a silicone oil which can be substantially completely volatilized until the polyurethane producing reaction (curing of the polyol with the isocyanate compound) is finished, under the temperature condition under which the polyol and the isocyanate compound are reacted to produce the polyurethane covering layer 16. If the silicone oil is not completely volatilized until the polyurethane forming reaction between the polyol and the isocyanate compound is substantially completed, the silicon oil remains in the formed polyurethane layer (covering layer 16), which may possibly contaminate the surface of the photosensitive drum. Most desirably, the volatile silicone oil has a volatilizability such that it completely volatilizes in about 30 minutes when heated at 150° C. A particularly preferable volatile silicone oil is a non-reactive silicone oil which does not react with the polyol and the isocyanate compound used. As a volatile silicone oil, use may be made of a dimethyl silicone oil, and a cyclic silicone oil, as well as a derivative thereof such as an alkyl-modified form or polyether-modified form thereof. Among them, a silicone oil having 10 or less siloxane linkage units (—SiO—) is particularly preferred. To be non-reactive, the two free remaining valencies in each —SiO— linkage unit are satisfied by organic radicals having no active hydrogen, such as alkyl groups, aralkyl groups, or aryl groups, and in the case of a linear silicone oil, its both ends are terminated also with the non-reactive organic groups noted above.

The polyol and the isocyanate compound are contained in the above-mentioned reaction mixture in amounts such that ratio of the hydroxyl equivalents of the polyol to the isocyanate equivalents of the isocyanate compound is about 1:1, and the isocyanate compound may be present in slight excess. Further, the volatile silicone oil is preferably contained in an amount of 1 to 30% of the weight of the polyol used, and more preferably in an amount of 5 to 20% of the weight of the polyol used.

Most preferably, the covering layer 16 can be formed in situ by coating a reaction mixture containing, in a suitable solvent, the polyol (particularly, a liquid fluorine-containing polyol), the isocyanate compound and the pore-forming agent comprising the volatile silicone oil, optionally together with an electrical conductivity-imparting agent (e.g., carbon black, metallic powder, etc.) and/or a filler (e.g., silica, etc.) on the surface of the conductive layer 14, as a thin layer, by a technique such as spray coating, and heating the coated layer at a temperature sufficient to react the polyol and the isocyanate compound, usually, at about 100 to about 200° C. In this case, the solvent used will have a volatilizability equal to or higher than that of the volatile silicone oil, such as butyl acetate. Usually, the coated layer is cured in about 20 to 60 minutes.

When the volatile silicone oil is present in the mixture of the polyol and the isocyanate, the volatile silicone oil can initially be caused to present in the mixture of the polyol and the isocyanate owing to the presence of the solvent immediately after the coating. However, as the solvent is gradually evaporated by heating, the volatile silicone oil, which is insoluble in the mixture of the polyol and the isocyanate compound, can not remain dissolved in the mixture of the polyol and the isocyanate compound. As a result, the volatile silicone oil forms a large number of discrete microdrops in the mixture of the polyol and the isocyanate compound, and it is believed that a so-called sea-and-island structure is thus formed in which the polyol and the isocyanate compound constitute a continuous phase (the sea) and the microdrops of the volatile silicone oil form the islands. While the sea-and-island structure from which the solvent is evaporated off is further heated, and the polyol and the isocyanate compound react to produce a polyurethane, the microdrops of the volatile silicone oil having constituted the islands are evaporated to leave the pores thereat, rendering the polyurethane covering layer 16 porous.

The size of each pore of the covering layer 16 comprised of the porous body is as described above, and can be determined depending on the kind of the volatile silicone oil used. Any of the above-exemplified volatile silicone oils may provide a pore size within such a range as described above.

Incidentally, the present invention has found that, while the microporous fluorine-containing polyurethane covering layer 16, which is produced by the reaction of the isocyanate compound with the flourine-containing polyol as the preferred polyol, is strong in the negative chargeability due to the present of fluorine, the triboeletric series of the fluorine-containing polyurethane microporous covering layer can be changed by allowing a reactive silicone oil having an active hydrogen to coexist in the polyurethane-producing reaction, thereby incorporating components having a siloxane linkage into the polyurethane which forms the covering layer. The reactive silicone oil involving in the reaction with the isocyanate compound together with the flourine-containing polyol introduces the siloxane component into the polyurethane formed by the reaction between the polyol and the isocyanate compound. Siloxanes or silicones exhibit positive chargeability by themselves in the triboeletric series. If an incorporated amount thereof is larger, it is possible to increase the positive chargeability of the resultant microporous fluorine-containing polyurethane covering layer 16. That is, the triboeletric series of the covering layer can be changed by changing the amount of the reactive silicone oil added. In this case, the covering layer comprises, of course, a reaction product of the polyol and the reactive silicone oil with the isocyanate compound (i.e., silicone-modified polyurethane).

The reactive silicone oil having an active hydrogen is capable of reacting with the isocyanate compound and includes a silicone oil having an amino group, a silicone oil having a mercapto group, a silicone oil having a hydroxyl group (e.g., a silicone oil having a carboxyl group, a silicone oil having a phenolic OH group, a silicone oil having an alcoholic OH group). These reactive silicone oils are commercially available as amino-modified silicone oils, mercapto-modified silicone oils, carboxyl-modified silicone oils, phenol-modified silicone oils, or carbinol-modified silicone oils. In the present invention, any silicone oils having the above-mentioned reactive group only at one terminal or at both terminals, and/or in the side chain can be used.

More preferred reactive silicone oils may be represented by the formula (1) or (2):

(1)

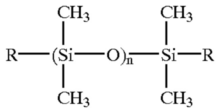

(2)

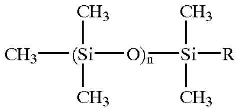

In the formulas (1) and (2), each R represents $—C_3H_6OC_2H_4OH$ or $—C_3H_6OCH_2—C(CH_2OH)_2C_2H_5$, and n is an integer of about 20 or less. Particularly preferred reactive silicone oils are those of the formula (1) in which each R represents $—C_3H_6OC_2H_4OH$, and among them, the one wherein n is about 10 is most preferable. Such reactive silicone oils are also commercially available.

To form a covering layer made of the silicone-incorporated, fluorine-containing microporous polyurethane, the reactive silicone oil having an active hydrogen can be added to the reaction mixture described with reference to the microporous fluorine-containing polyurethane. The resultant reaction admixture can be coated on the conductive layer 14, and reacted under the same reaction conditions as above. In this reaction, the volatile silicone oil exhibits the volatility behavior as described earlier, and the reaction silicone oil constitutes the continuous phase together with the flourine-containing polyol and the isocyanate compound. By this reaction, there is obtained a microporous fluorine-containing polyurethane which, though having the silicone introduced thereinto, has the same pore size as the previously mentioned microporous fluorine-containing polyurethane into which no silicone is introduced. In this case, the ratio of the hydroxyl equivalent plus the active hydrogen equivalent to the isocyanate equivalent is 1:1, or the isocyanate compound may be present in slight excess.

With regard to the mixing ratio of the fluorine-containing polyol and the reaction silicone oil, an excessively large amount of reactive silicone oil causes the properties of the silicone to appear strongly in the covering layer itself, bringing about the generation of bad influences such as reduction of the anti-wear property of the covering layer, and thus is not preferable. In general, the weight ratio of the fluorine-containing polyol to the reactive silicone oil is preferably 1:3 or less, within which range the triboeletric series can be changed from negative chargeability to positive chargeability by changing the amount of the reactive silicone oil.

Incidentally, some commercially available reactive silicone products contain 10% by weight or more of volatile silicon oils which can be used in the present invention. When the reactive silicon oil product containing such a large amount of volatile silicone oil, no volatile silicone oil may be not necessary to be added separately for forming the porous body (i.e., the contained volatile silicone oil can be used as a whole), or the amount of the volatile silicone oil to be added separately can be reduced, depending on the required amount of volatile silicone oil. Thus, it is advisable to determine beforehand the amount of volatile silicone oil contained in the reactive silicone oil product by an analytical means such as gel permeation chromatography (GPC).

In the developing roller 10 of the present invention, the covering layer 16, which provides the outermost layer of the roller is made of the porous body described above, and accordingly the surface of the roller constitutes a microscopically roughened surface by the pores. Thus, the image force exerted on the toner is weakened as compared to the prior art developing roller in which the outermost layer is of a smooth surface. As a result, with the developing roller of the present invention, the removal of the remaining toner carried out by the toner-supplying member is more facilitated, and fresh toner can be more readily adhered to the outermost layer. Therefore, with the developing roller of the present invention, the negative ghost, which is caused by the toner remaining on the developing roller, is far more suppressed as compared to the prior art developing roller having a smooth surface. Further, the covering layer constituting the outermost layer of the developing roller of the invention is porous, and thus is elastic and readily deformable in response to an external force. In addition, the covering layer of the invention forms a film far softer than the toner, does not damage the toner at, for example, the nip portion with the photosensitive drum.

The present invention will be described below by way of its Examples. However, the present invention should not be limited by these Examples.

EXAMPLE 1

A shaft roller core made of iron having an outer diameter of 10 mm was covered with an electrically conductive silicone rubber having a volume resistivity of 106 Ω·cm and a JIS A hardness of 45° to prepare a rubber-coated roller having an outer diameter of 16 mm.

On the other hand, to 100 parts by weight of a fluorine-containing polyol (ZEFFLE available from Daikin Industries, Inc., Japan) and 5 parts by weight of electrically conductive carbon black (available from Cabot), 300 parts by weight of butyl acetate was added, and the mixture was mixed using a disperser. The resultant dispersion was added with 5 parts by weight of volatile silicone oil (KF 96L available from Sinetsu Chemical Industries, Japan) and was stirred to prepare a main component. The main component was added with a urethane-modified hexamethylene diisocyanate (DURANATE available from Asahi Kasei Kogyo, Japan) as a curing agent in an amount such that the ratio of the hydroxyl equivalent in the main component to the isocyanate equivalent in the curing agent was 1:1 to prepare a coating material A. The coating material A was spray-coated onto the rubber-coated roller to a thickness of 10 μm, air-dried, and then heated at 160° C. for 40 minutes to form a desired microporous covering layer. The covering layer had a surface roughness in the circumferential direction, Rz, of 4 μm.

COMPARATIVE EXAMPLE

The same procedures were followed as in Example 1, except that no volatile silicone oil was added, to prepare a developing roller having a non-porous (dense) covering layer. The surface roughness in the circumferential direction, Rz, was 4 μm.

<Negative Ghost Test>

To evaluate whether the developing roller prepared in Example 1 is advantageous in performance over the developing roller prepared in Comparative Example, the developing rollers of Example 1 and Comparative Example were each installed in a laser beam printer DP-560 available from Mita Industries which uses a positively charged toner, and a test chart sheet having black regions printed thereon was printed to examine whether the character ghosts appear on the black regions in the copied paper sheets. The test chart sheet used as an A4 size paper sheet and had a character region consisting of a large number of character lines each printed with a large number of characters, and a figure region in which a plurality of black square figures are printed, and had longitudinal black stripes printed at the both side portions, extending to cross all the character lines towards the figure region. The figure region was present between the two black stripes.

As a result, while negative ghosts were generated with the developing roller of Comparative Example, no negative ghosts were generated with the developing roller of Example 1. Thus, it was demonstrated that the porous covering layer is effective in preventing the generation of negative ghosts.

Next, in order to demonstrate that an positive chargeability is increased in a covering layer having a negative chargeability by introducing a reactive silicone oil having hydroxyl groups into the covering layer by the chemical reaction, glass plates were prepared which were coated with modified polyurethane having different triboelectric series with amounts of reactive silicone oils varied in the following Examples 2 to 8.

EXAMPLE 2

A coating material B was prepared having the same composition as the coating material A of Example 1 except that no conductive carbon black was added. This coating material B was spray-coated onto a glass plate to a thickness of 10 μm, air-dried, and heated to 160° C. for 40 minutes to form a desired microporous covering layer.

EXAMPLE 3

A coating material C was prepared following the same procedures as in Example 2, except that 10 parts by weight of a carbinol-modified reactive silicone oil (X-22-16-A available from Shinetsu Chemical Industries, Japan; a silicone oil of the above-described formula (1) in which each R represents —$C_3H_6OC_2H_4OH$, and n denotes an integer of about 10) were further added, and the ratio of the volatile silicone oil to the total amount of the fluorine-containing polyol and the reactive silicone oil was adjusted to be the same ratio of the volatile silicone oil to the total amount of the fluorine-containing polyol in Example 2. A microporous covering layer was formed on a glass plate as in Example 2, using the thus prepared coating material C.

EXAMPLE 4

A glass plate having a microporous covering layer was prepared as in Example 3, except that the amount of the carbinol-modified reactive silicone oil was changed to 25 parts by weight.

EXAMPLE 5

A glass plate having a microporous covering layer was prepared as in Example 3, except that the amount of the carbinol-modified reactive silicone oil was changed to 50 parts by weight.

EXAMPLE 6

A glass plate having a microporous covering layer was prepared as in Example 3, except that the amount of the carbinol-modified reactive silicone oil was changed to 75 parts by weight.

Further, a developing roller was prepared following the same procedures as in Example 1, except that the coating material prepared in this Example was used.

EXAMPLE 7

A glass plate having a microporous covering layer was prepared as in Example 3, except that the amount of the carbinol-modified reactive silicone oil was changed to 100 parts by weight.

EXAMPLE 8

A glass plate having a microporous covering layer was prepared as in Example 3, except that the amount of the carbinol-modified reactive silicone oil was changed to 150 parts by weight.

<Frictional Chargeability Test>

To investigate the triboelectric series, the glass plates were rubbed each other at their covering layers to frictionally charge the covering layers. The charged potentials were measured by using a surface potentiometer (available from Monroe) to determine the triboelectric series of the glass plates of Examples 2 to 8. As a result, it was found that the covering layer of Example 2 exhibited negative chargeability, and the positive chargeability became stronger in the order of from Example 2 to Example 8, indicating that the larger the amount of the reactive silicone oil, the stronger the positive chargeability.

<Observation on Scanning Electron Microscope Photograph>

Figure 2:
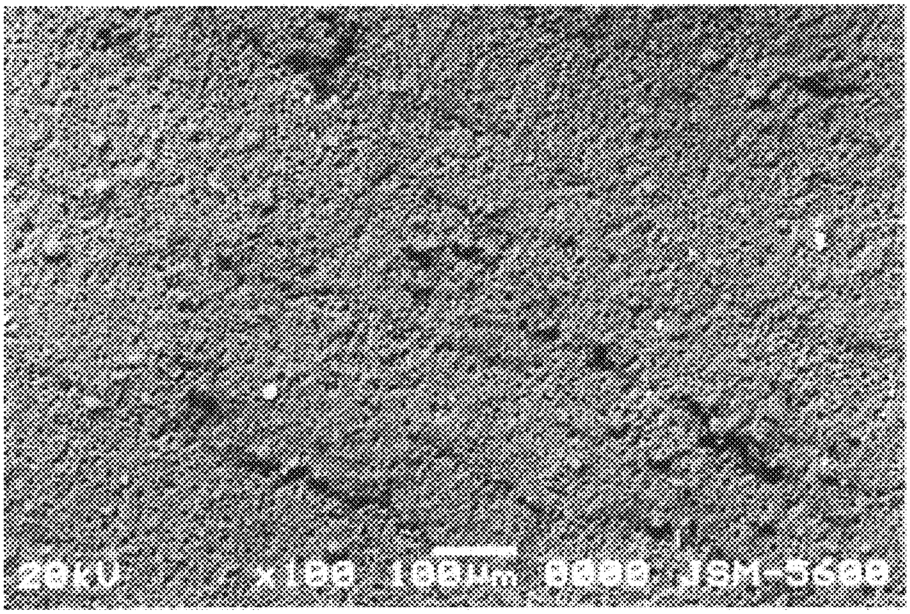
FIG. 2 is a scanning electron microscope photograph at a magnification of 100, showing the surface state of the developing roller produced in Example 6 described hereinbelow of the present invention.
Figure 3:
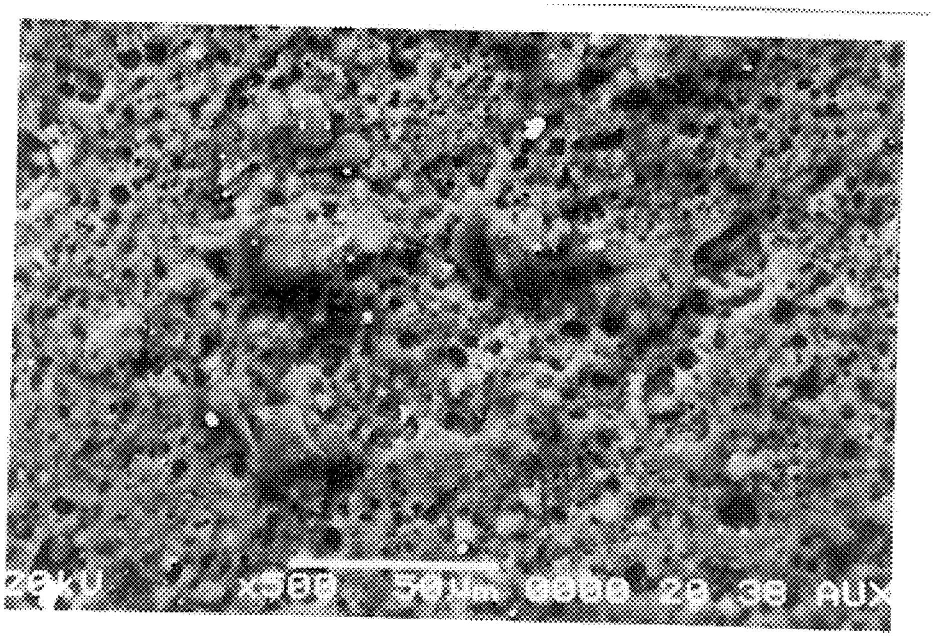
FIG. 3 is a scanning electron microscope photograph at a magnification of 500, showing the surface state of the developing roller produced in Example 6 described hereinbelow of the present invention.
Figure 4:
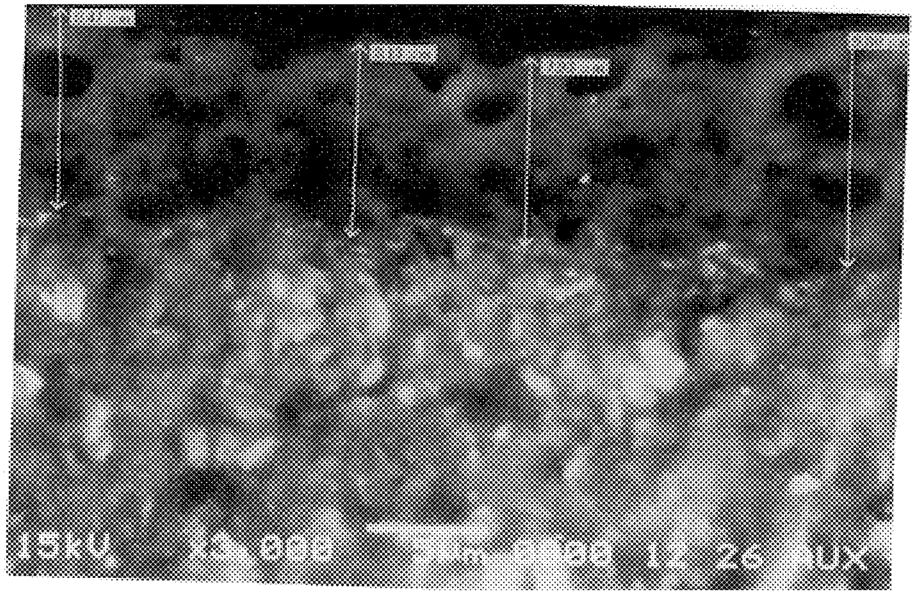
FIG. 4 is a scanning electron microscope photograph at a magnification of 3000, showing the cross-section of the conductive layer and the covering layer in the developing roller produced in Example 6 described herein below of the present invention.

To confirm that the covering layer is porous such that a large number of pores having a size of 3 μm or less in the roller surface, scanning electron microscope photographs were taken on the developing roller prepared in Example 6. The photographs are shown in FIGS. 2 to 4. FIG. 2 is a photograph at a magnification of 100 showing the surface of the roller, FIG. 3 is a photograph at a magnification of 500 showing the surface of the roller, and FIG. 4 is a photograph at a magnification of 3000 showing the cross-section of the conductive layer (conductive silicone rubber layer) and the covering layer. The observation of these photographs indicate that the covering layer of the developing roller of the invention constitutes a porous body throughout which a large number of pores having a size of 3 μm or less is formed.

EXAMPLE 9

To test whether a roller of the invention is practically used in a printer using a positively charged toner in comparison with the roller of Example 1, a developing roller was prepared following the same procedures as in Example 1, except that 75 parts by weight of the carbinol-modified reactive silicone oil used in Example 3 were further added, and the ratio of the conductive carbon black to the volatile silicone oil was adjusted as in Example 1.

<Fog Test 1>

Each of the rollers of Examples 1 and 9 was installed in a laser beam printer (DP-560 available from Mita Industries, Japan) using a positively charged toner, and a predetermined chart sheet was printed. The chart sheet used was a paper sheet of A4 size, in which, in the top region, a total of four of black (closed) squares and white (open) squares each having a side length of about 20 mm were printed space apart from each other in the order of black, white, black and white squares from the left side in top region, while, in the bottom region, a white square was printed at a position corresponding to the central black square in the top region, and two black squares were printed each of which was at position corresponding to the position between the black and white squares positioned at either side. The lightness was measured by a colorimeter (available from Minolta, Japan). The fog amount is defined as a value obtained by dividing the difference between the lightness of a paper sheet before printing and the lightness at the printed white squares on the printed paper sheet by the lightness of the paper sheet before printing, and is expressed in percentage.

The fog amount of the developing roller originally installed in the DP-560 of Mita Industries was 0.5%. Thus, the fog amount of 0.5% or less was evaluated as "pass", and the fog amount of over 0.5% was evaluated as "fail". The developing roller of Example 1 was 0.2% in the fog amount, and thus evaluated in "pass", while the developing roller of Example 9 was 2% in the fog amount, and thus evaluated as "fail", indicating that, with respect to a printer using a positively charged toner the roller of Example 1, which had a large negative chargeability, exhibited the satisfactory result, and that the roller of Example 9, which had a large positive chargeability, was large in the fog amount and could not be used satisfactorily.

EXAMPLE 10

A shaft roller core made of iron having an outer diameter of 10 mm was covered with an electrically conductive silicone rubber having a volume resistivity of 106 Ω·cm and a JIS A hardness of 25° to prepare a rubber-coated roller having an outer diameter of 20 mm. The same covering layer was provided on the conductive rubber layer as in Example 1 to prepare a developing roller.

EXAMPLE 11

A developing roller was prepared following the same procedures as in Example 10, except that the covering layer of Example 9 was used.

<Fog Test 2>

Each of the developing rollers prepared in Examples 10 and 11 was installed in a printer, MULTIWRITER NW 2, available from Nippon Electric Corp., Japan, and the fog amount was measured as in Fog Test 1 described above.

The fog amount of the developing roller originally installed in MULTIWRITER NW 2 of Nippon Electric Corp. was 2%. Thus, the fog amount of 2% or less was evaluated as "pass", and the fog amount of over 2% was evaluated as "fail". The developing roller of Example 10 was 3% in the fog amount, and thus evaluated as "fail", while the developing roller of Example 11 was 1.5% in the fog amount, and thus evaluated as "pass", indicating that, with respect to a printer using a negatively charged toner, the roller of Example 11, which had a large positive chargeability, exhibited the satisfactory result, and the roller of Example 10, which had a large negative chargeability, was large in the fog amount and could not be used satisfactorily.

These results indicate that the formulation of the covering layer of Example 1, which does not contain a reactive silicone oil, is effective for a printer using a positively charged toner, while the formulation of the covering layer of Example 9, in which a reactive silicone oil is also reacted, is effective for a printer using a negatively charged toner. In addition, these results demonstrate that the covering layer of the present invention can cope with any of positively and negatively charged toners by adjusting the amount of a reactive silicone oil used.

Further, all the rollers prepared in Examples described above did not contaminate the photosensitive drum surface.

As has been described above, a developing roller which suppresses the generation of negative ghosts is provided according to the present invention. Further, the developing roller of the invention does not contaminate the photosensitive drum surface. Furthermore, according to the present invention, a developing roller can be readily prepared which is optimum for any of positively or negatively charged toner since the triboeletric series can be changed by a simple change in the amount of a reactive silicone oil used, though the prior art developing rollers can not cope with the change in the polarity of the charged toner.

The present invention has been described above with reference to some preferred embodiments thereof. However, additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A developing roller which comprises:

a roller core, an electrically conductive layer provided on a circumferential surface of said roller core, and a covering layer provided on the outer circumferential surface of said conductive layer, wherein said covering layer has a thickness of 30 μm or less, but 0.1 μm or more, and has at least its surface region formed of a porous body.

2. The developing roller according to claim 1, wherein the pores in said at least surface region of said covering layer have a size of 3 μm or less, but 0.1 μm or more.

3. The developing roller according to claim 2, wherein said covering layer is entirely formed of said porous body.

4. The developing roller according to claim 1, wherein said conductive layer is formed of an electrically conductive rubber material.

5. The developing roller according to claim 1, wherein said covering layer comprises a reaction product of a polyol and an isocyanate compound.

6. The developing roller according to claim 5, wherein said polyol is a fluorine-containing polyol.

7. The developing roller according to claim 1, wherein said covering layer is formed of a reaction product of a mixture of a polyol, an isocyanate compound and a reactive silicone oil having an active hydrogen.

8. The developing roller according to claim 7, wherein said polyol is a fluorine-containing polyol.

9. A developing roller which comprises:

a roller core, an electrically conductive layer provided on a circumferential surface of said roller core, and a covering layer provided on the outer circumferential surface of said conductive layer, wherein said covering layer is formed by subjecting a reaction mixture containing a polyol, an isocyanate compound, and a pore-forming agent comprising a volatile silicon oil to a reaction condition for reacting said polyol with said isocyanate compound.

10. The developing roller according to claim 9, wherein said polyol is a fluorine-containing polyol.

11. The developing roller according to claim 10, wherein said fluorine-containing polyol is a copolymer polyol containing ethylene tetrafluoride units as a main component.

12. The developing roller according to claim 9, further comprising a reactive silicone oil represented by the following formula (1) or (2):

(1)

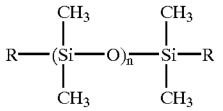

(2)

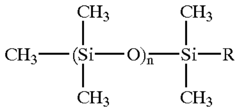

where in the formulas (1) and (2), each R represents $—C_3H_6OC_2H_4OH$ or $—C_3H_6OCH_2—(CH_2OH)_2C_2H_5$, and n is an integer of about 20 or less.

13. The developing roller according to claim 10, wherein a triboelectric series of said covering layer is changed by changing a mixing ratio between said fluorine-containing polyol and said reactive silicone oil.

14. The developing roller according to claim 9, wherein said conductive layer is formed of an electrically conductive rubber material comprising at least one rubber selected from silicone rubber, an acrylonitrile-butadiene rubber, a silicone-modified ethylene-propylene rubber, and a urethane rubber, each imparted with electrical conductivity.

15. A developing roller which comprises:

a roller core, an electrically conductive layer provided on a circumferential surface of said roller core, and a covering layer provided on the outer circumferential surface of said conductive layer, wherein said covering layer is formed by subjecting a reaction mixture containing a polyol, a reactive silicone oil having an active hydrogen, an isocyanate compound, and a pore-forming agent comprising a volatile silicon oil to a reaction condition for reacting said polyol and said reactive silicone oil with said isocyanate compound.

16. The developing roller according to claim 15, wherein said polyol is a fluorine-containing polyol.

17. The developing roller according to claim 16, wherein said fluorine-containing polyol is a copolymer polyol containing ethylene tetrafluoride units as a main component.

18. The developing roller according to claim 15, wherein said reactive silicone oil is preferably represented by the following formula (1) or (2):

(1)

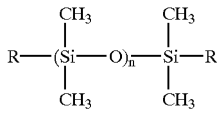

(2)

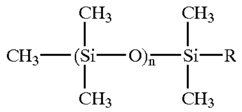

where in the formulas (1) and (2), each R represents $-C_3H_6OC_2H_4OH$ or $-C_3H_6OCH_2-C(CH_2OH)_2C_2H_5$, and n is an integer of about 20 or less.

19. The developing roller according to claim 16, wherein a triboelectric series of said covering layer is changed by changing a mixing ratio between said fluorine-containing polyol and said reactive silicone oil.

20. The developing roller according to claim 15, wherein said conductive layer is formed of an electrically conductive rubber material comprising at least one rubber selected from silicone rubber, an acrylonitrile-butadiene rubber, a silicone-modified ethylene-propylene rubber, and a urethane rubber, each imparted with electrical conductivity.

* * * * *